US012747825B2

(12) United States Patent
Yu

(10) Patent No.: US 12,747,825 B2
(45) Date of Patent: Sep. 29, 2026

(54) FOLDABLE STAND

(71) Applicant: Shenzhen Shuyou Trading Co., Ltd., Shenzhen (CN)

(72) Inventor: Hui'e Yu, Shenzhen (CN)

(73) Assignee: Shenzhen Shuyou Trading Co., Ltd., Shenzhen (CN)

( * ) Notice: Subject to any disclaimer, the term of this patent is extended or adjusted under 35 U.S.C. 154(b) by 4 days.

(21) Appl. No.: 19/019,202

(22) Filed: Jan. 13, 2025

(65) Prior Publication Data

US 2026/0177199 A1 Jun. 25, 2026

(30) Foreign Application Priority Data

Dec. 19, 2024 (CN) ......................... 202423170712.6

(51) Int. Cl.
*F16M 11/38* (2006.01)
*E04H 12/22* (2006.01)

(52) U.S. Cl.
CPC ................................... *F16M 11/38* (2013.01)

(58) Field of Classification Search
CPC .... A47G 33/12; A47G 33/1206; A41G 1/007; E04H 12/22; E04H 12/2238; E04H 12/2246; F16M 11/32
USPC ........................ 248/166, 188.8, 188.7, 188.1
See application file for complete search history.

(56) References Cited

U.S. PATENT DOCUMENTS 5,290,004 A * 3/1994 Frost ...................... A47G 33/12 248/188.7
6,138,977 A * 10/2000 Tsai ...................... F16M 11/22 248/529
6,293,512 B1 * 9/2001 Ho ...................... F16M 11/22 248/407
6,688,565 B1 * 2/2004 Chen ...................... F16M 11/38 248/188.7
9,254,055 B2 * 2/2016 Wong ...................... A47G 33/12
10,143,322 B2 * 12/2018 Cheng ................ A47G 33/1206
10,743,697 B2 * 8/2020 Cheng ................. E04H 12/2238
12,178,345 B2 * 12/2024 Chiang .................. A47G 33/12
2005/0121591 A1 * 6/2005 Tsai ...................... A47G 33/12 248/529
2009/0039230 A1 * 2/2009 Cheng .................... A47G 33/12 248/523
2014/0291472 A1 * 10/2014 Leung ................ A47G 33/1206 248/524

(Continued)

*Primary Examiner* — Nkeisha Smith
(74) *Attorney, Agent, or Firm* — All West Law Group, PLLC; Aaron Powell

(57) ABSTRACT

A foldable stand includes an adjustment assembly, a first bracket and a second bracket. The adjustment assembly includes a bottom base, a control sleeve, a limited sleeve connected to the bottom base and a lock assembly. The limited sleeve is arranged between the bottom base and the control sleeve. The limited sleeve is provided with a first through hole, the bottom base is provided with a second through hole, which is located below one end of the first through hole. The lock assembly includes a limited column and an elastic component. The control sleeve is arranged at one end of the elastic component, the limited column is arranged at an opposite end of the elastic component, and the limited column is arranged in the first through hole. The first bracket is connected to the bottom base, the second bracket is connected to the control sleeve.

10 Claims, 6 Drawing Sheets

(56) References Cited

U.S. PATENT DOCUMENTS

| | | | | |
|---|---|---|---|---|
| 2014/0353456 | A1* | 12/2014 | Wong | E04H 12/22 248/523 |
| 2017/0231412 | A1* | 8/2017 | Cheng | E04H 12/2238 248/523 |

* cited by examiner

FOLDABLE STAND

CROSS-REFERENCE TO RELATED APPLICATIONS

The present application claims the benefit of Chinese Patent Application No. 202423170712.6 filed on Dec. 19, 2024, the contents of which are hereby incorporated by reference.

TECHNICAL FIELD

The present invention belongs to the technical field of stands, and particularly relates to a foldable stand.

TECHNICAL BACKGROUND

A Christmas tree stand is a device used to support and stabilize a Christmas tree. Its main function is to keep the Christmas tree upright and prevent it from tipping over. There are two common types of Christmas tree stands:

(1) Fixed stand: This type of stand uses a fixed connection structure between the supporting legs. The connection is stable and not easy to tip over, so this type of stand can support a heavy Christmas tree. However, the fixed design makes this type of stand occupy a large area and cannot be folded for storage.

(2) Foldable stand: The supporting legs of this type of stand are movably connected and can be folded or unfolded. However, this type of stand may have insufficient load-bearing capacity and poor stability. When in use, the supporting legs may rock back and forth or even tip over, affecting the user experience.

INVENTION CONTENT

In order to overcome the defects of the existing technology, the present invention provides a foldable stand includes an adjustment assembly that can keep the stand open to avoid tipping over, thereby improving the user experience.

The technical scheme adopted by the present invention for solving the technical problems is as follows:

A foldable stand includes an adjustment assembly, a first bracket and a second bracket. The adjustment assembly further includes a bottom base, a control sleeve, a limited sleeve connected to the bottom base and a lock assembly. The limited sleeve is arranged between the bottom base and the control sleeve. The limited sleeve is provided with a first through hole, the bottom base is provided with a second through hole, which is located below one end of the first through hole. The lock assembly includes a limited column and an elastic component. The control sleeve is arranged at one end of the elastic component, the limited column is arranged at an opposite end of the elastic component, and the limited column is arranged in the first through hole. The first bracket is connected to the bottom base, and the second bracket is connected to the control sleeve.

Further, the control sleeve, the bottom base and the limited sleeve are respectively configured as an annular structure.

Further, the first through hole is set as an arc shape hole, and the second through hole is set as a circular hole.

Further, the control sleeve is provided with a placement notch. One end of the elastic component is arranged inside the placement notch.

Further, the lock assembly includes a connection block. The limited column is connected to a bottom end of the connection block, and a protruding button is arranged on the side of the connection block.

Further, a blind hole is arranged on a top side of the connection block, and one end of the elastic component is arranged in the blind hole.

Further, a limited block is arranged at the bottom end of the connection block. An outer edge of the limited sleeve is provided with a limited slot, which corresponds to one end of the first through hole.

Further, the stand further includes a connection pole. The first bracket includes a central shaft provided with an annular plug hole. One end of the connection pole is plugged into the plug hole, and other end of the connection pole is connected to the control sleeve.

Further, the central shaft includes a central part and a connection part. The second bracket includes a first connection ring and a second connection ring. The first connection ring and the second connection ring are arranged at intervals. The second connection ring is sleeved on an outer periphery of the connection part. The first connection ring, the bottom base and the limited sleeve are all sleeved on an outer periphery of the connection pole. The bottom base and the limited sleeve are arranged above the first connection ring and are fixedly connected to the first connection ring.

Further, an outer diameter of the connection part is adapted to an inner diameter of the second connection ring, and an outer diameter of the second connection ring is adapted to an outer diameter of the central part.

The beneficial effects of the present invention:

The present invention provides a foldable stand, which can be quickly folded and opened by arranging an adjustment assembly connected to a first bracket and a second bracket of the stand. In addition, the adjustment assembly can keep the stand open, always maintain an even supporting force, avoid tipping over, thereby enhancing the user experience.

DESCRIPTION OF MARKS IN FIGURES

1—adjustment assembly; 11—bottom base; 111—second through hole; 12—control sleeve; 121—placement notch; 122—second screw thread; 13—limited sleeve; 131—first through hole; 132—limited slot; 14—lock assembly; 141—limited column; 142—elastic component; 143—connection block; 144—blind hole; 145—limited block; 146—press button;

21—first bracket; 211—central shaft; 2111—plug hole; 2112—central part; 2113—connection part; 22—second bracket; 221—first connection ring; 222—second connection ring; 23—connection pole; 231—first screw thread.

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

The present invention provides a foldable stand, which can be quickly folded and opened by arranging an adjustment assembly connected to a first bracket and a second bracket of the stand. In addition, the adjustment assembly can keep the stand open, provide strong stability, and is not easy to tip, thereby enhancing the user experience.

Figure 1:
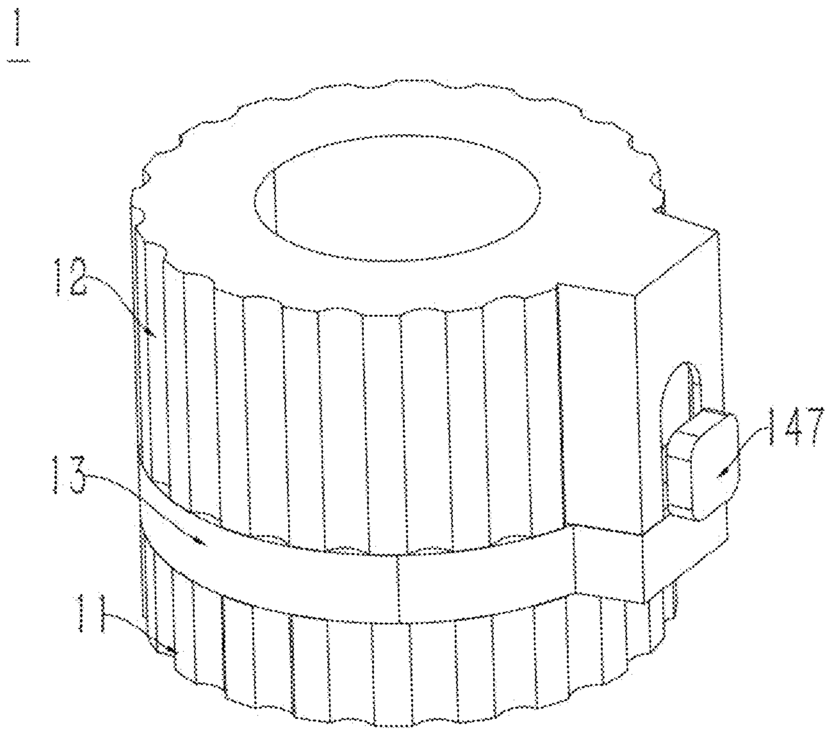
FIG. 1 is a schematic view of a adjustment assembly of the present invention (axis side)
Figure 2:
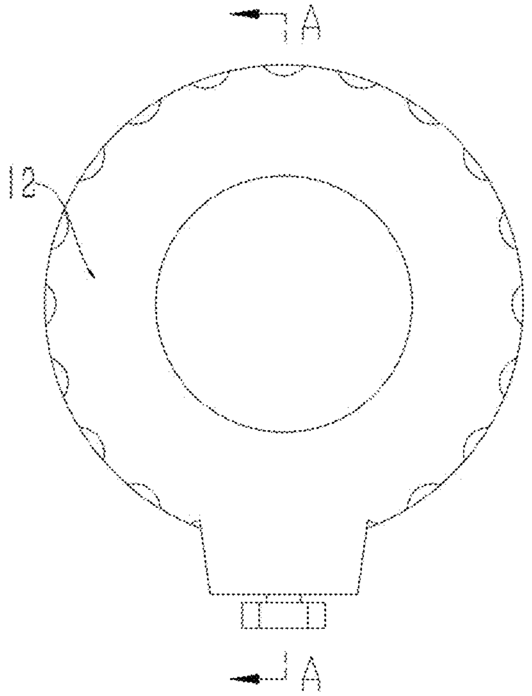
FIG. 2 is a schematic view of the adjustment assembly of the present invention (top view)
Figure 3:
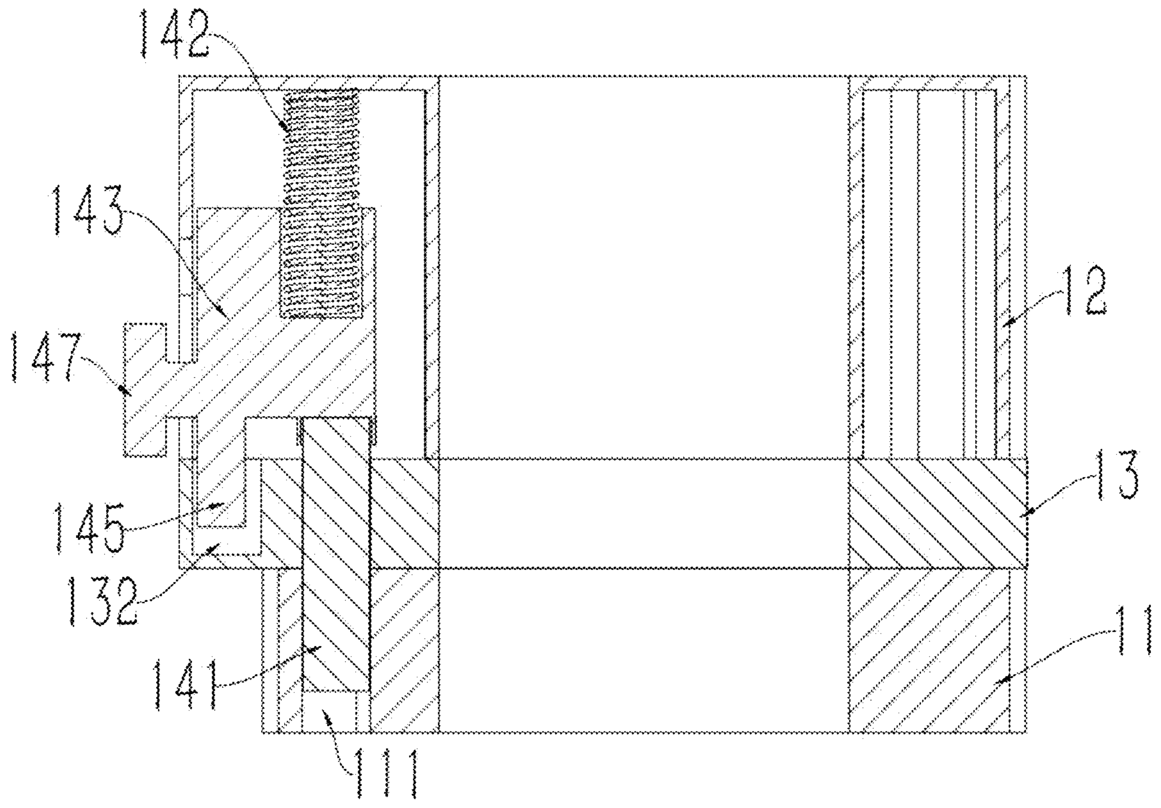
FIG. 3 is a cross-sectional view along the line A-A in FIG. 2.
Figure 4:
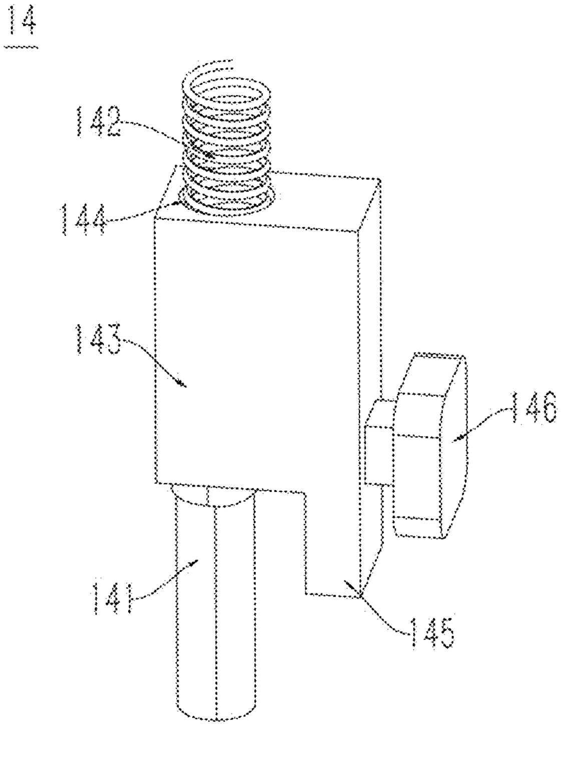
FIG. 4 is a schematic view of a lock assembly of the present invention.
Figure 5:
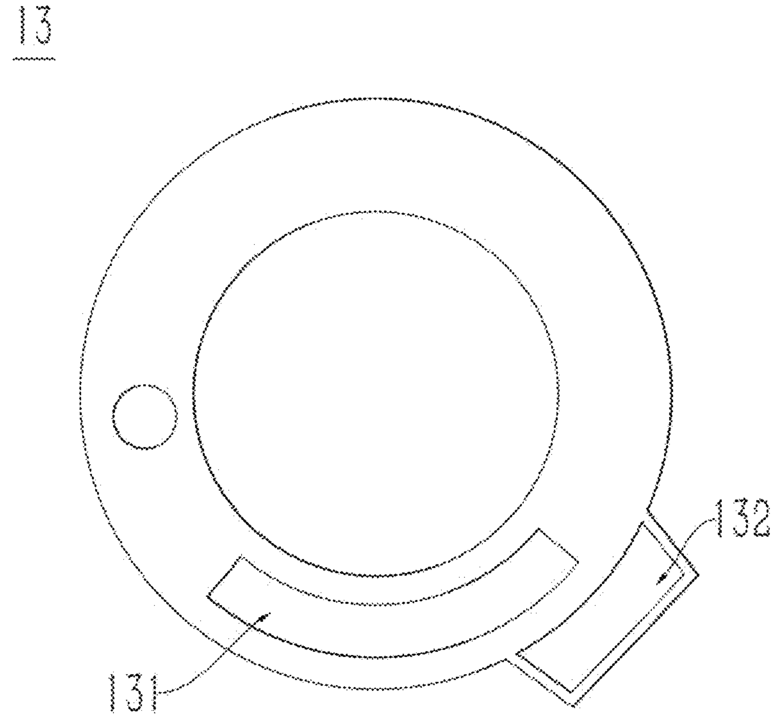
FIG. 5 is a schematic view of a limited sleeve of the present invention.
Figure 6:
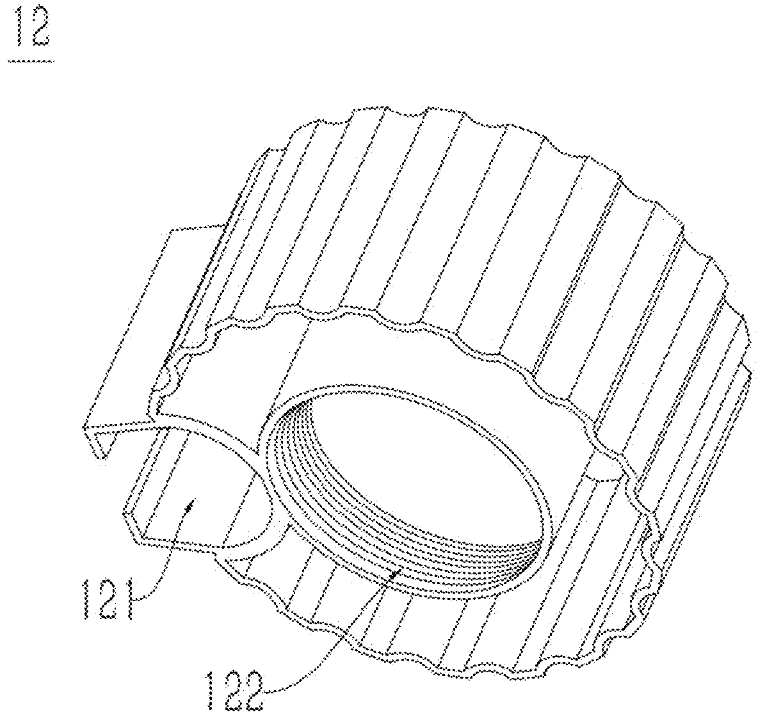
FIG. 6 is a schematic view of a control sleeve of the present invention.
Figure 7:
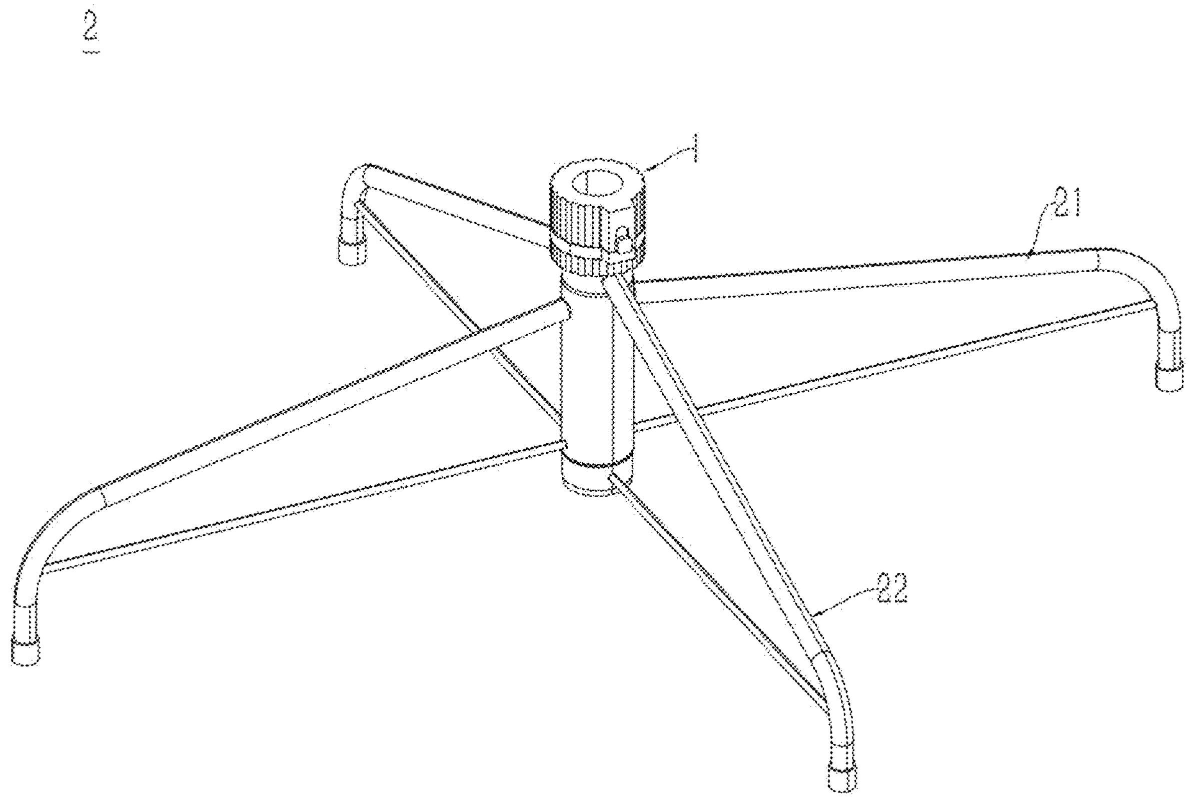
FIG. 7 is a schematic view of a stand of the present invention in an open state.
Figure 8:
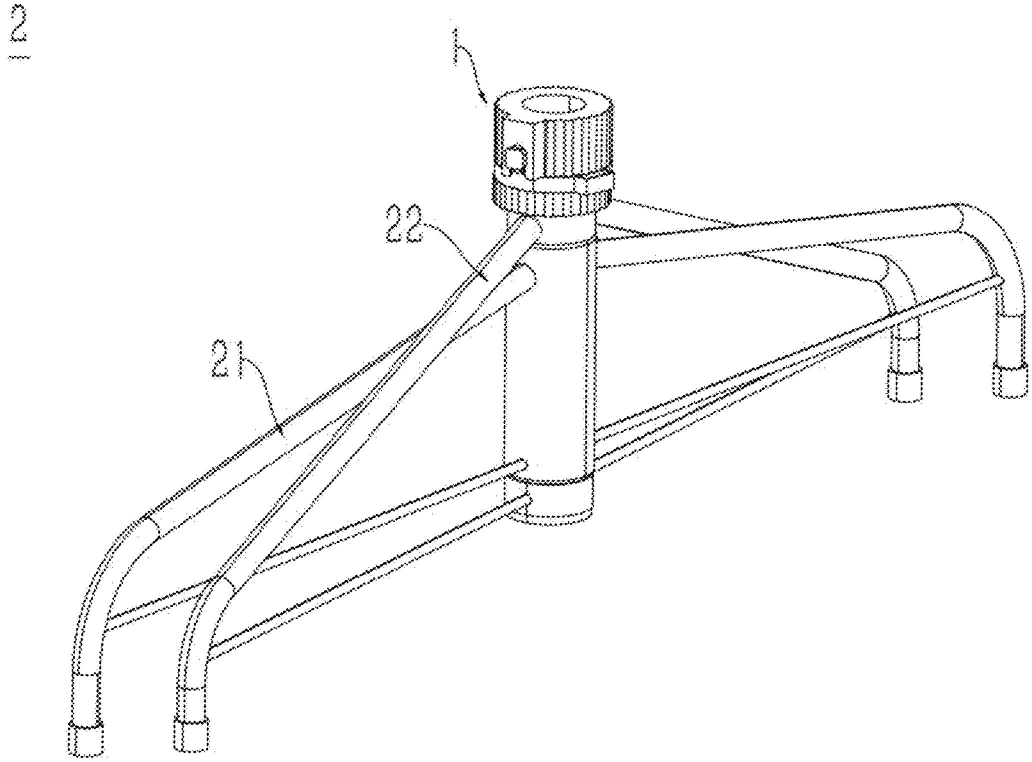
FIG. 8 is a schematic view of the stand of the present invention in a folded state.
Figure 9:
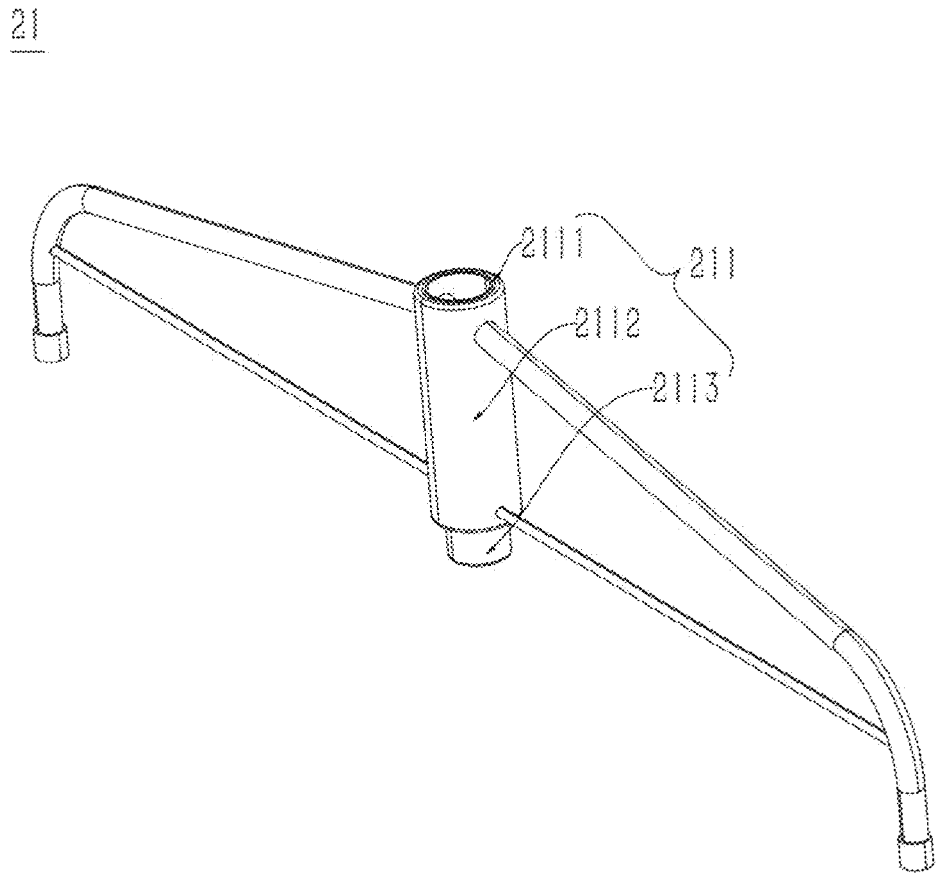
FIG. 9 is a schematic view of a first bracket of the present invention.
Figure 10:
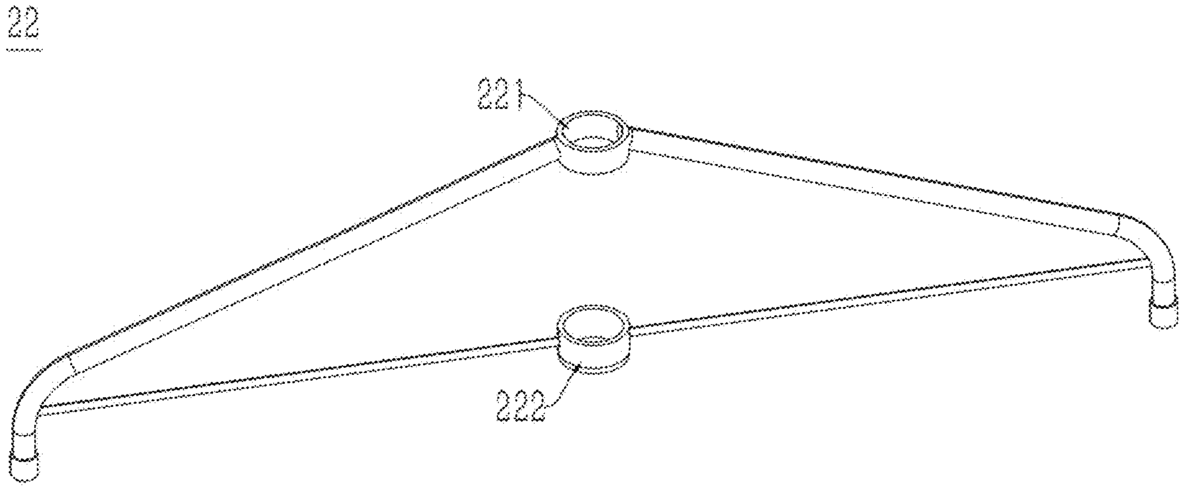
FIG. 10 is a schematic view of a second bracket of the present invention.
Figure 11:
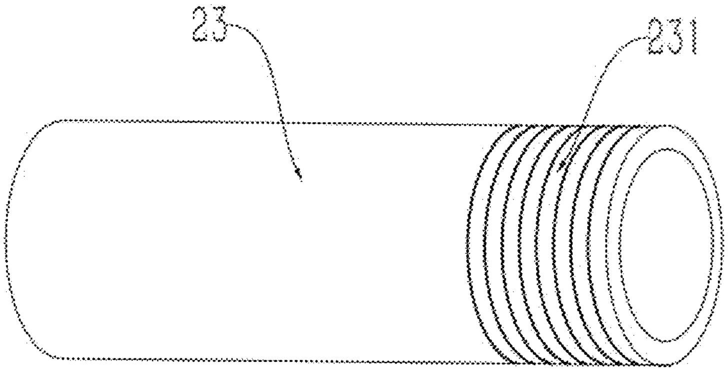
FIG. 11 is a schematic view of a connection pole of the present invention.

Referring to FIGS. 1-11, this embodiment provides a foldable stand, including an adjustment assembly 1, a first bracket 21 and a second bracket 22. The adjustment assembly 1 includes a bottom base 11, a control sleeve 12, a limited sleeve 13 connected to the bottom base 11 and a lock assembly 14. The limited sleeve 13 is arranged between the bottom base 11 and the control sleeve 12. The limited sleeve 13 is provided with a first through hole 131, the bottom base 11 is provided with a second through hole 111, which is located below one end of the first through hole 131. The lock assembly 14 includes a limited column 141 and an elastic component 142. The control sleeve 12 is arranged at one end of the elastic component 142, the limited column 141 is arranged at an opposite end of the elastic component 142, and the limited column 141 is arranged in the first through hole 131. The first bracket 21 is connected to the bottom base 11, and the second bracket 22 is connected to the control sleeve 12.

Under the action of external force, the limited column 141 and the control sleeve 12 can slide along the first through hole 131, move relative to the bottom base 11 and the limited sleeve 13, and then drive the first bracket 21 and the second bracket 22 to move relative to each other, thereby realizing the foldable function of the stand.

For the convenience of description, two ends of the first through hole 131 are respectively arranged as end A and end B. Given that the second through hole 111 is arranged below the end A of the first through hole 131. In the initial state, the bottom of the limited column 141 is inserted into the second through hole 111. The second through hole 111 can limit the control sleeve 12 and the limited column 141. The limited column 141 cannot move toward the direction of the end B, so that the control sleeve 12 and the bottom base 11 are in a relatively fixed state.

During assembly, when the control sleeve 12 and the bottom base 13 are relatively fixed, the stand is fully opened; when the control sleeve 12 and the bottom base 13 are relatively movable, the angle of the stand can be adjusted or folded.

When the relative position of the control sleeve 12 and the bottom base 11 needs to be adjusted, an external force is applied to move the limited column 141 upward and compress the elastic component 142. The bottom of the limited column 141 is disengaged from the second through hole 111, and the limited column 141 can continue to move toward the end B. The limited column 141 drives the control sleeve 12 to move together, and the elastic reset force of the elastic component 142 will make one lower end of the limited column 141 abut against an upper surface of the bottom base 11. When the limited column 141 moves to the end A again, the reset force will push the limited column 141 to be inserted into the second through hole 111 again.

Further, the control sleeve 12, the bottom base 11 and the limited slot 13 are respectively configured as an annular structure.

Further, the first through hole 131 is set as an arc shape hole, and the second through hole 111 is set as a circular hole.

Preferably, a placement notch 121 is arranged on the control sleeve 12, and one end of the elastic component 142 is arranged inside the placement notch 121.

In this embodiment, the elastic component 142 is a spring. In practical applications, other components with elastic compression and reset functions can be selected to replace the spring.

Preferably, the lock assembly 14 includes a connection block 143. The limited column 141 is connected to the bottom end of the connection block 143, and a protruding button 146 is arranged on one side of the connection block 143. Users can drive the connection block 143 to move through the button 146, thereby driving the limited column 141 to move, which can facilitate users to adjust the control sleeve 12.

Preferably, a blind hole 144 is arranged on the top side of the connection block 143, and the end of the elastic component 142 is arranged in the blind hole 144. The blind hole 144 can prevent the spring from deflecting or rotating when the spring is subjected to force, so that the spring can move along a specific path or direction during operation, thereby ensuring the stability of the spring.

Further, a limited block 145 is arranged at the bottom end of the connection block 143. The outer edge of the limited sleeve 13 is provided with a limited slot 132, which corresponds to one end of the first through hole 131.

Specifically, the limited slot 132 corresponds to the end A of the first through hole 131. When the limited column 141 is inserted into the second through hole 111, the limited block 145 is simultaneously inserted into the limited slot 132 to achieve a secondary positioning effect, so that the control sleeve 12 and the bottom base 11 are in a relatively fixed state. When the relative position of the control sleeve 12 and the bottom base 11 needs to be adjusted, an external force is required to push the button 146, so that the connection block 143 moves upward, driving the limited block 145 to disengage from the limited slot 132, and the limited column 141 to disengage from the second through hole 111, so that the control sleeve 12 and the bottom base 11 can rotate relatively.

By connecting the first bracket 21 and the second bracket 22 of the stand to the control sleeve 12 and the bottom base 11 respectively, the first bracket 21 and the second bracket 22 can be folded or opened with each other. When not in use, the stand can be folded for easy storage, and opened to provide support when needed.

For the convenience of description, given that the Christmas tree stand in this embodiment is in a folded state, the limited column 141 is located at the end B of the first through hole 131. The first bracket 21 and the second bracket 22 are arranged adjacent to each other, occupying a smaller space, which is convenient for users to store; when the stand in this embodiment needs to be used, an external force is applied to make the limited column 141 slide toward the end A of the first through hole 131. The control sleeve 12 and the bottom base 11 rotate relative to each other, driving the first bracket 21 and the second bracket 22 to rotate synchronously, until the limited column 141 is inserted into the second through hole 111, and the stand is in a fully open state, which is convenient for users to place the stand on the ground and insert the Christmas tree ornaments in the control sleeve 12 to support the Christmas tree.

Preferably, the stand also includes a connection pole 23. The first bracket 21 includes a central shaft 211, which is provided with an annular plug hole 2111. One end of the connection pole 23 is plugged into the plug hole 2111, and other end of the connection pole 23 is connected to the control sleeve 12.

Further, a first screw thread 231 is arranged on the outer periphery of one end of the connection pole 23, and a second screw thread 122 is arranged on the inner wall of the control sleeve 12. The connection pole 23 and the control sleeve 12 are connected by threaded cooperation.

Understandably, the elastic component 142 has a limited service life. After frequent use, the elastic component 142 will lose its elasticity and cannot provide effective driving force for the movement of the limited column 141. As a result, the limited column 141 is unable to be inserted into the second through hole 111, and the control sleeve 12 and the bottom base 11 are unable to be kept in a relatively fixed state. By designing the connection structure between the connection pole 23 and the control sleeve 12 as a detachable threaded connection, users can unscrew the control sleeve 12 and remove it to replace the elastic component 142, thereby ensuring that the adjustment assembly 1 can work normally.

It should be noted that the portion of the connection pole 23 inserted into the plug hole 2111 is interference fit with the plug hole 2111, so that the connection pole 23 and the central shaft 211 are in a fixed state, and relative rotation between the two can be prevented. Accordingly, when there is a force to rotate the connection pole 23, the connection pole 23 will drive the central shaft 211 to rotate together.

During the process of opening and folding the stand, taking the second bracket 22 as a reference, the first bracket 21 rotates relative to the second bracket 22, and the control sleeve 12 and the limited column 141 also rotate synchronously until the limited column 141 moves to the end A of the first through hole 131 and is inserted into the second through hole 111, or the limited column 141 moves to the end B of the first through hole 131, and the first bracket 21 can no longer rotate relative to the second bracket 22.

In combination with the above description that the first through hole 131 is set as an arc-shaped through hole, it can be known that the extension angle of the arc-shaped through hole is the angle at which the first bracket 21 can rotate. Specifically, in this embodiment, the angle of the first through hole 131 is set to 90 degrees. Correspondingly, the angle at which the first bracket 21 can rotate relative to the second bracket 22 is also 90 degrees. The first bracket 21 and the second bracket 22 are provided with two opposing supporting feet respectively. When the first bracket 21 and the second bracket 22 are fully opened, the supporting feet of the first bracket 21 and the supporting feet of the second bracket 22 are perpendicular to each other, and jointly provide a stable supporting force.

Preferably, the central shaft 211 includes a central part 2112 and a connection part 2113. The second bracket 22 includes a first connection ring 221 and a second connection ring 222. The first connection ring 221 and the second connection ring 222 are arranged at intervals. The second connection ring 222 is sleeved on the outer periphery of the connection part 2113. The first connection ring 221, the bottom base 11 and the limited sleeve 13 are all sleeved on the outer periphery of the connection pole 23. The bottom base 11 and the limited sleeve 13 are located above the first connection ring 221 and are fixedly connected to the first connection ring 221.

Preferably, the outer diameter of the connection part 2113 is adapted to the inner diameter of the second connection ring 222, and the outer diameter of the second connection ring 222 is adapted to the outer diameter of the central part 2112. When the first bracket 21 and the second bracket 22 are assembled together, the whole is more beautiful.

The steps for assembling the stand of this embodiment are as follows:

First, the second connection ring 222 of the second bracket 22 is sleeved on the outer periphery of the connection part 2113. The first connection ring 221 of the second bracket 22 is located at the top of the central shaft 211 and coincides with the axis of the central shaft 211. After passing through the first connection ring 221, one end of the connection pole 23 is inserted into the plug hole 2111 on the first bracket 21, and fits tightly with the first bracket 21. Secondly, the control sleeve 12 and the connection pole 23 are connected threadedly. Finally, the bottom base 11 and the first connection ring 221 are fixedly connected. At this point, the stand assembly is completed.

It could be understood that under the guidance of the above embodiments, those skilled in the filed can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

What is claimed is:

1. A foldable stand, comprises an adjustment assembly, a first bracket and a second bracket, wherein the adjustment assembly further comprises a bottom base, a control sleeve, a limited sleeve connected to the bottom base and a lock assembly; the limited sleeve is arranged between the bottom base and the control sleeve; the limited sleeve is provided with a first through hole, the bottom base is provided with a second through hole, which is located below one end of the first through hole; the lock assembly comprises a limited column and an elastic component; the control sleeve is arranged at one end of the elastic component, the limited column is arranged at an opposite end of the elastic component, and the limited column is arranged in the first through hole; the first bracket is connected to the bottom base, and the second bracket is connected to the control sleeve.

2. The foldable stand according to claim 1, wherein the control sleeve, the bottom base and the limited sleeve are respectively configured as an annular structure.

3. The foldable stand according to claim 1, wherein the first through hole is set as an arc shape hole, and the second through hole is set as a circular hole.

4. The foldable stand according to claim 1, wherein the control sleeve is provided with a placement notch; one end of the elastic component is arranged inside the placement notch.

5. The foldable stand according to claim 1, wherein the lock assembly comprises a connection block; the limited column is connected to a bottom end of the connection block, and a protruding button is arranged on one side of the connection block.

6. The foldable stand according to claim 1, wherein a blind hole is arranged on a top side of the connection block, and one end of the elastic component is arranged in the blind hole.

7. The foldable stand according to claim 1, wherein a limited block is arranged at the bottom end of the connection block; an outer edge of the limited sleeve is provided with a limited slot, which corresponds to one end of the first through hole.

8. The foldable stand according to claim 1, further comprises a connection pole, wherein the first bracket comprises a central shaft provided with an annular plug hole; one end of the connection pole is plugged into the plug hole, and other end of the connection pole is connected to the control sleeve.

9. The foldable stand according to claim 8, wherein the central shaft comprises a central part and a connection part; the second bracket includes a first connection ring and a second connection ring; the first connection ring and the second connection ring are arranged at intervals; the second connection ring is sleeved on an outer periphery of the connection part; the first connection ring, the bottom base and the limited sleeve are all sleeved on an outer periphery of the connection pole; the bottom base and the limited sleeve are arranged above the first connection ring and fixedly connected to the first connection ring.

10. The foldable stand according to claim 9, wherein an outer diameter of the connection part is adapted to an inner diameter of the second connection ring, and an outer diameter of the second connection ring is adapted to an outer diameter of the central part.

* * * * *